United States Patent [19]
Yamanaka

[11] 3,764,787
[45] Oct. 9, 1973

[54] METHOD AND APPARATUS FOR PULSE DISTRIBUTION WITH VARIABLE TIME INTERVAL FOR PULSE TRAIN GENERATION

[75] Inventor: Ritsuzo Yamanaka, Suginami-ku, Tokyo, Japan

[73] Assignee: Iwatsu Electric Co., Ltd., Tokyo, Japan

[22] Filed: Oct. 12, 1971

[21] Appl. No.: 188,549

Related U.S. Application Data

[63] Continuation-in-part of Ser. No. 860,197, Sept. 23, 1969, abandoned.

[52] U.S. Cl............ 235/152, 328/129, 340/347 DD
[51] Int. Cl.............................................. H03k 5/13
[58] Field of Search.............. 340/347 DD; 235/154, 235/155, 152; 328/129, 130

[56] References Cited

UNITED STATES PATENTS

| | | | |
|---|---|---|---|
| 3,004,252 | 10/1961 | Zola, Jr. et al. | 340/347 DD |
| 3,603,773 | 9/1971 | Carlstein | 235/154 |
| 3,632,876 | 1/1972 | Bench | 340/347 DD |

*Primary Examiner*—Malcolm A. Morrison
*Assistant Examiner*—David H. Malzahn
*Attorney*—Woodcock, Washburn, Kurtz & Mackiewicz

[57] ABSTRACT

A method for pulse distribution includes the detection of the highest bit position in a plural bit input. A pulse sending interval corresponding to the highest input bit position is determined, and pulse trains corresponding to the highest bit position and the input bits are selected. A pulse train sum is then generated by selected pulse trains during the pulse sending interval.

8 Claims, 10 Drawing Figures

METHOD AND APPARATUS FOR PULSE DISTRIBUTION WITH VARIABLE TIME INTERVAL FOR PULSE TRAIN GENERATION

RELATED APPLICATIONS

This application is a continuation-in-part of copending application Ser. No. 860,197, filed Sept. 23, 1969 now abandoned.

BACKGROUND OF THE INVENTION

1. Field of the Invention

This invention relates to methods and apparatus for pulse distribution, and more particularly to methods and apparatus wherein one or more pulse trains corresponding to input information are selected from a plurality of pulse trains and selected pulse trains are summed.

2. The Prior Art

In digital control systems or similar applications where linear interpolation of two points in two dimensional or three dimensional space is accomplished, a simple method of pulse distribution is utilized. This method of pulse distribution will be explained for the two dimensional case. First, the input information $dX$ and $dY$ is stored in an $n$-bit binary counter where $dX$ and $dY$ represent the difference between two points. Equal interval pulse trains I(1), I(2), I(3), I(4) . . . I($2^{n-1}$), consisting of 1, 2, 4, 8 . . . $2^{(n-1)}$ equal interval pulses respectively which are generated during a constant pulse sending time interval (see FIG. 1) are applied to respective AND gates or AND circuits. By applying these pulse trains to the AND circuitry, one or more pulse trains are selected. These selected pulse trains are then applied to OR gates or OR circuits, and the pulse trains necessary for the linear interpolation between two points are obtained from the OR circuitry. By the above mentioned method, pulse trains with small $n$ or frequencies are used when the input information $dX$ and $dY$ is of small magnitude, and pulse trains with large $n$ or frequencies are used when $dX$ and $dY$ are large. Since the pulse sending time is constant in both cases, as shown in FIG. 1, so the interpolation time for small $dX$ and $dY$ is equal to the interpolation time for the large $dX$ and $dY$. Therefore, in the case of small $dX$ and $dY$ magnitude, the pulse recurrence interval or space between pulses of the pulse train obtained from the OR circuits becomes large in average, and unnecessary time is consumed. To fulfill the requirement of high speed control of various equipment, a pulse distribution system reducing the pulse recurrence time for small magnitude of $dX$ and $dY$ is required.

SUMMARY AND OBJECTS OF THE INVENTION

The object of this invention is to provide a method and apparatus for pulse distribution in which very high speed pulse distribution is achieved.

Another object of this invention is to provide a method and apparatus for pulse distribution in which the pulse train sum consisting of relatively high frequency pulses is obtained irrespective of the magnitude of the input information.

A further object of this invention is to provide a method and apparatus for pulse distribution in which pulse distribution is achieved during a pulse sending interval determined by the highest occupied bit position in the input information.

In accordance with an aspect of this invention, the method for pulse distribution comprises detecting the highest occupied bit position from the plural input bits, determining the pulse sending interval corresponding to the highest bit position, selecting the pulse trains from a plurality of pulse trains in accordance with input bits and the highest bit position of the input information, and obtaining the pulse train sum by sending out the selected pulse trains during the pulse sending interval.

In accordance with another aspect of this invention, the apparatus for pulse distribution comprises plural registers for storing plural bits of input information, means for detecting the highest bit from said plural input bits, and means for determining a pluse sending interval corresponding to the highest bit. The apparatus further comprises a pulse generator for generating a plurality of pulse trains, means for selecting pulse trains corresponding to the input bits and the highest bit position in the input information, and means for obtaining a pulse train sum by summing the selected pulse trains during the pulse sending interval.

The invention will be described in more detail, by way of example, with reference to the accompanying drawings.

DETAILED DESCRIPTION OF THE ILLUSTRATED EMBODIMENT

The logic for the method of pulse distribution in accordance with this invention will first be explained.

Figures 1, 2A, 2B:
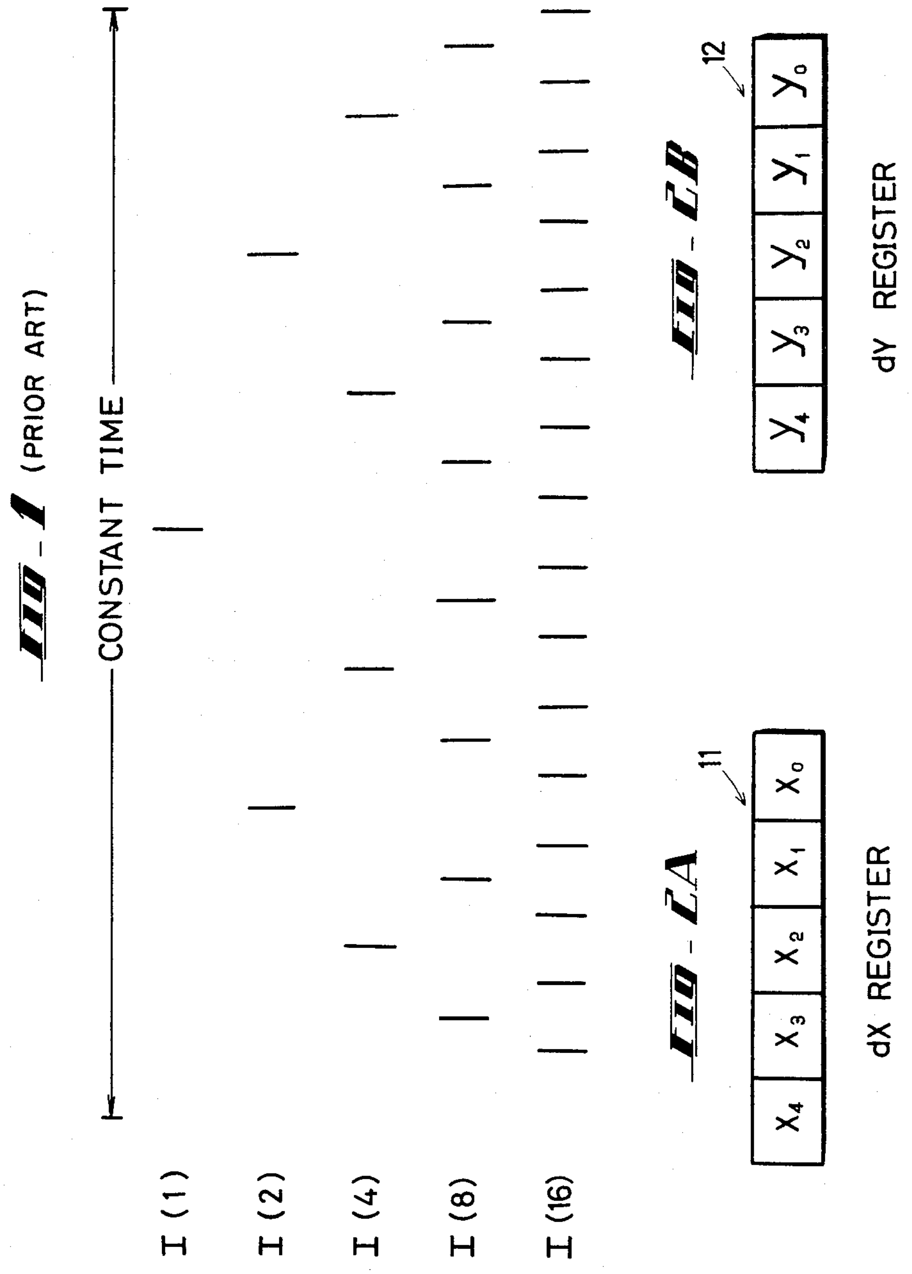
FIG. 1 (PRIOR ART), FIG. 2A, FIG. 2B
FIG. 1 is a waveform diagram relating to a prior art pulse distributor.
FIG. 2A is a block diagram illustrating the $dX$ register of one embodiment of a pulse distributor in accordance with this invention.
FIG. 2B is a block diagram illustrating the $dY$ register of said pulse distributor.
Figure 3B:
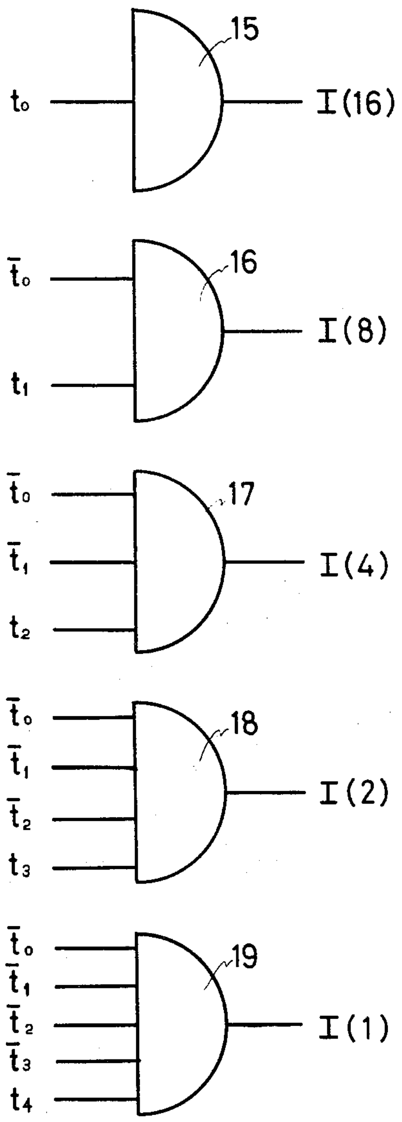
FIG. 3B is a block diagram illustrating the logical circuit of said pulse distributor which operates in response to the binary counter.
Figure 3A:
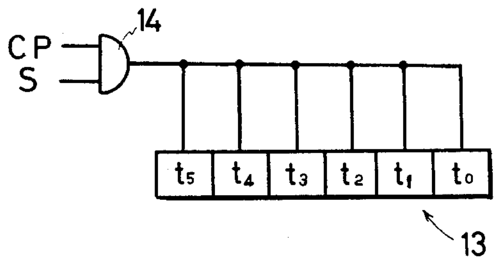
FIG. 3A is a block diagram illustrating the binary counter of said pulse distributor.

If the respective bits of inputs $dX$ and $dY$ stored in a $dX$ register and a $dY$ register respectively are represented by $$dX = x_{n-1}, x_{n-2}, \ldots x_2, x_1, x_0$$

$$dY = y_{n-1}, y_{n-2}, \ldots y_2, y_1, y_0$$

as shown in FIGS. 2A and 2B for $n = 5$ where $$x_i = 1 \text{ or } 0, \text{ and } y_i = 0,$$

the highest occupied bit position in each register is determined by the following procedures.

Logical sum $P_i$ of each bit position of $dX$ and $dY$ will be obtained by:

$$P_{n-1} = x_{n-1} + y_{n-1},$$
$$P_{n-2} = x_{n-2} + y_{n-2}$$
$$P_2 = x_2 + y_2,$$
$$P_1 = x_1 + y_1,$$
$$P_0 = x_0 + y_0.$$

And logical products $N_i$ of the logical sum $P_i$ of each bit position and the NOT values of logical sum $\overline{P_i}$ for all the bit positions above $i$-th bit position will be obtained by:

$$N_{n-1} = P_{n-1} ,$$
$$N_{n-2} = \overline{P_{n-1}} \cdot P_{n-2},$$
$$N_2 = \overline{P_{n-1}} \cdot \overline{P_{n-2}} \ldots \overline{P_3} \cdot P_2,$$
$$N_1 = \overline{P_{n-1}} \cdot \overline{P_{n-2}} \ldots \overline{P_3} \cdot \overline{P_2} \cdot P_1,$$
$$N_0 = \overline{P_{n-1}} \cdot \overline{P_{n-2}} \ldots \overline{P_3} \cdot \overline{P_2} \cdot \overline{P_1} \cdot P_0.$$

The logical product $N_i$ will become 1 only when $i$ represents the highest occupied bit position.

If pulse sending interval $T$ for the highest bit is $T_{n-1}$, $T$ is determined by $$T = T_{n-1} \text{ for } N_{n-1} = 1,$$
$$T = T_{n-1/2} \text{ for } N_{n-2} = 1,$$
$$T = T_{n-1/2(n-3)} \text{ for } N_2 = 1,$$
$$T = T_{n-1/2(n-2)} \text{ for } N_1 = 1,$$
$$T = T_{n-1/2(n-1)} \text{ for } N_0 = 1.$$

The signals applied to AND gates for the purpose of determining the necessary pulse trains for information $dX$, are represented by:

$$N_{n-1} \cdot x_{n-1} + N_{n-2} \cdot x_{n-2} + \ldots N_1 \cdot x_1 + N_0 \cdot x_0 \text{ for } I(2^{n-1}),$$
$$N_{n-1} \cdot x_{n-2} + N_{n-2} \cdot x_{n-3} + \ldots N_1 \cdot x_0 \text{ for } I(2^{n-2}),$$
$$N_{n-1} \cdot x_1 + N_{n-2} \cdot x_0 \quad \text{for } I(2),$$
$$N_{n-1} \cdot x_0 \quad \text{for } I(1).$$

And signals for the case of $dY$ will be obtained by similar procedures.

Therefore, pulse train sums $NdX$ and $NdY$ will be given by:

$$NdX = (N_{n-1} \cdot x_{n-1} + N_{n-2} \cdot x_{n-2} \ldots + N_1 \cdot x_1 + N_0 \cdot X_0) \cdot I(2^{n-1}) + (N_{n-1} \cdot x_{n-2} + N_{n-2} \cdot x_{n-3} + \ldots + N_1 \cdot x_0) \cdot I(2^{n-2}) + \ldots (N_{n-1} \cdot x_1 + N_{n-2} \cdot x_0) \cdot I(2) + (N_{n-1} \cdot x_0) \cdot I(1),$$

and $$NdY = (N_{n-1} \cdot y_{n-1} + N_{n-2} \cdot y_{n-2} + \ldots + N_1 \cdot y_1 + N_0 \cdot y_0) \cdot I(2^{n-1}) + (N_{n-1} \cdot y_{n-2} + N_{n-2} \cdot y_{n-3} + \ldots + N_1 \cdot y_0) \cdot I(2^{n-2}) + \ldots (N_{n-1} \cdot y_1 + N_{n-2} \cdot y_0) \cdot I(2) + (N_{n-1} \cdot y_0) \cdot I(1).$$

By above mentioned procedures, pulse sending interval $T$ and pulse train sums $NdX$ and $NdY$ can be obtained. And at the end of the sending interval $T$, new inputs $dX$ and $dY$ are introduced, and the next pulse distribution will follow without unnecessary time delay so as to furnish high speed pulse distribution.

Figure 4:
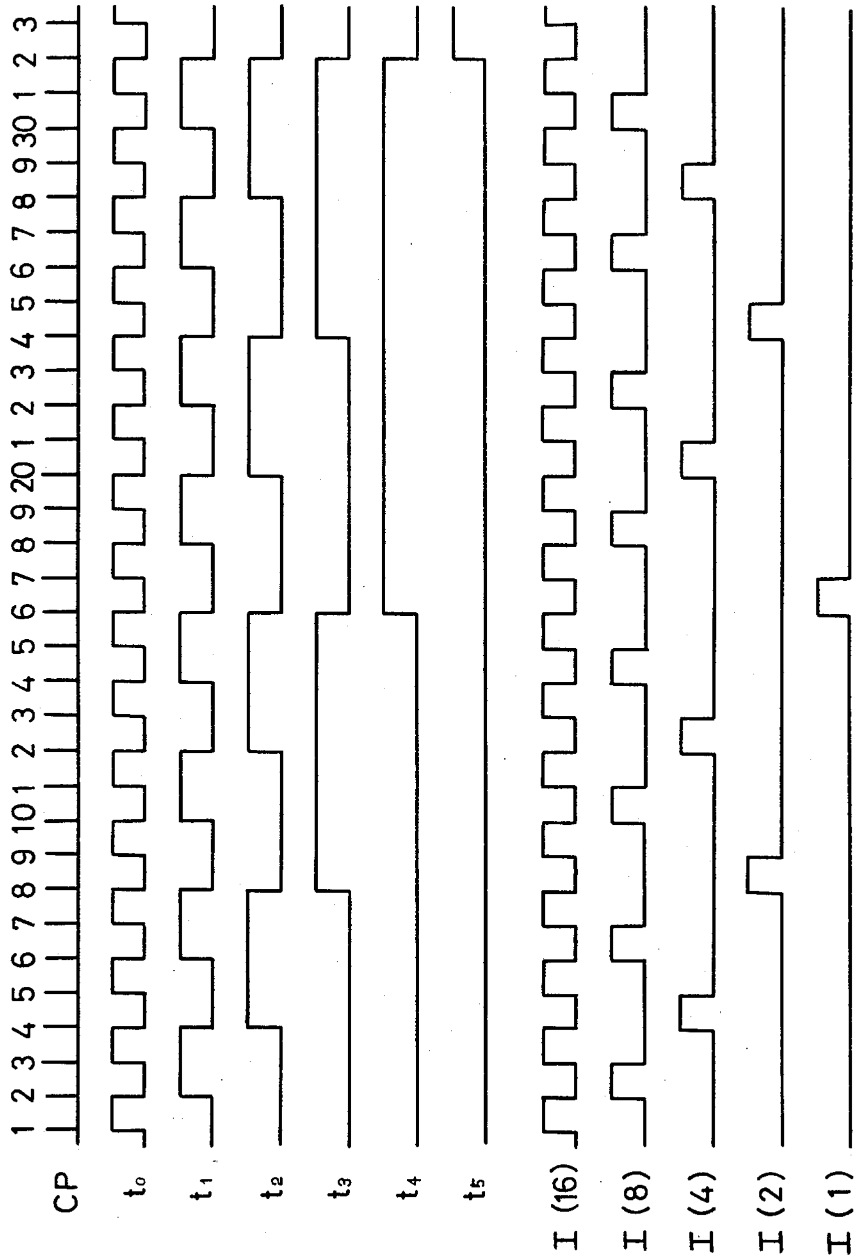
FIG. 4 is a waveform diagram relating to said pulse distributor.

Now the above described logic will be explained in terms of an apparatus for pulse distribution as illustrated in FIG. 2 to FIG. 8 for the case where $dX$ and $dY$ registers are 5 bits long. FIG. 2A and FIG. 2B show the $dX$ register 11 and the $dY$ register 12. In the $dX$ register and the $dY$ register, $x_0$ to $x_4$ and $y_0$ to $y_4$ input information bits are stored respectively, and replaced by other input information bits stored when one pulse distribution is finished. FIG. 3A shows a binary counter 13 with binary counter elements $t_0$ to $t_5$. When the clock pulses CP and starting signal S are applied to AND gate 14, binary counter element $t_0$ to $t_5$ generate outputs $t_0$ to $t_5$ with the waveforms shown in FIG. 4. These outputs $t_0$ to $t_4$ and NOT outputs $\overline{t_0}$ to $\overline{t_4}$ are applied to AND gates or AND circuits 15, 16, 17, 18 and 19 respectively as shown in FIG. 3B, and pulse trains I(1), I(2), I(4), I(8) and I(16) with the waveforms shown in FIG. 4 are generated.

Figure 5:
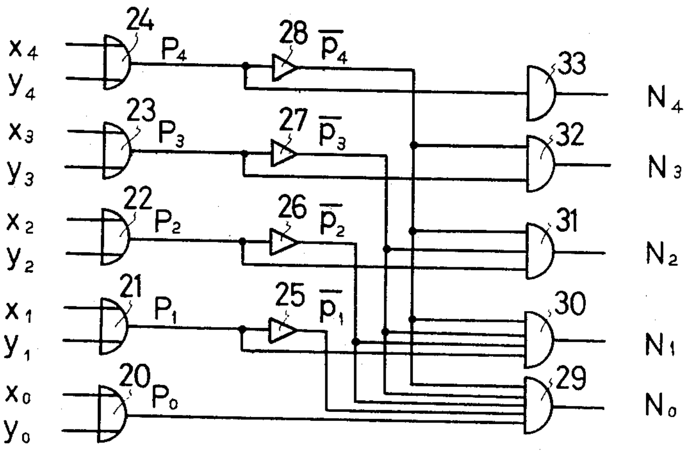
FIG. 5 is a block diagram illustrating the logical circuit of said pulse distributor for obtaining the highest input bit.

FIG. 5 illustrates a logical circuit to determine the highest occupied bit position of the inputs $dX$ and $dY$. When information of the same bit position from the $dX$ register and $dY$ register of FIGS. 2A and 2B are applied to OR gates or OR circuits 20, 21, 22, 23 and 24 respectively, respective logical sums $P_0$ to $P_4$ are obtained as the outputs of these OR circuits 20 to 24. These logical sums $P_1$ to $P_4$ are applied to the NOT circuits 25, 26, 27, and 28, and NOT values $\overline{P_1}$, $\overline{P_2}$, $\overline{P_3}$ and $\overline{P_4}$ of the logical sums $P_1$ to $P_4$ are obtained as the outputs of the NOT circuits 25, 26, 27 and 28. These outputs $P_0$ to $P_4$ and $\overline{P_1}$ to $\overline{P_4}$ are applied to AND circuits 29, 30, 31, 32 and 33 as shown in FIG. 5, and the highest bit position information $N_0$, $N_1$, $N_3$ and $N_4$ is obtained as one of the outputs of the circuits 29 to 33 i.e., a 1 will be generated at the AND circuit 29–33 corresponding to the N representing the highest occupied bit position.

Figure 6:
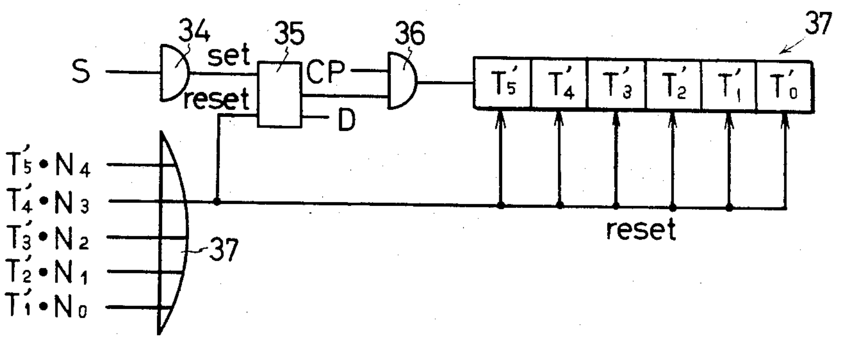
FIG. 6 is a block diagram illustrating the logical circuit of said pulse distributor for the determination of the pulse sending interval.

FIG. 6 is a block diagram of a logical circuit for determination of pulse sending time T. By application of the starting signal S to a flip-flop circuit 35 through AND circuit 34, the output of the flip-flop circuit 35 and clock pulses CP are applied to an open AND circuit 36. When the AND circuit 36 is opened, clock pulse CP is applied to each counter element $T_0'$, $T_1'$, $T_2'$, $T_3'$, $T_4'$ and $T_5'$ of the time counter 37. Pulse sending time $T$ is determined by the control of flip-flop circuit 35 with the logical products of outputs from the counter elements $T_1'$, to $T_5'$ of the time counter 37 and the highest bit position information $N_0$, $N_1$, $N_3$, and $N_4$, as shown in FIG. 6. A pulse D is sent out only when flip-flop circuit 35 represents "1."

Figure 7:
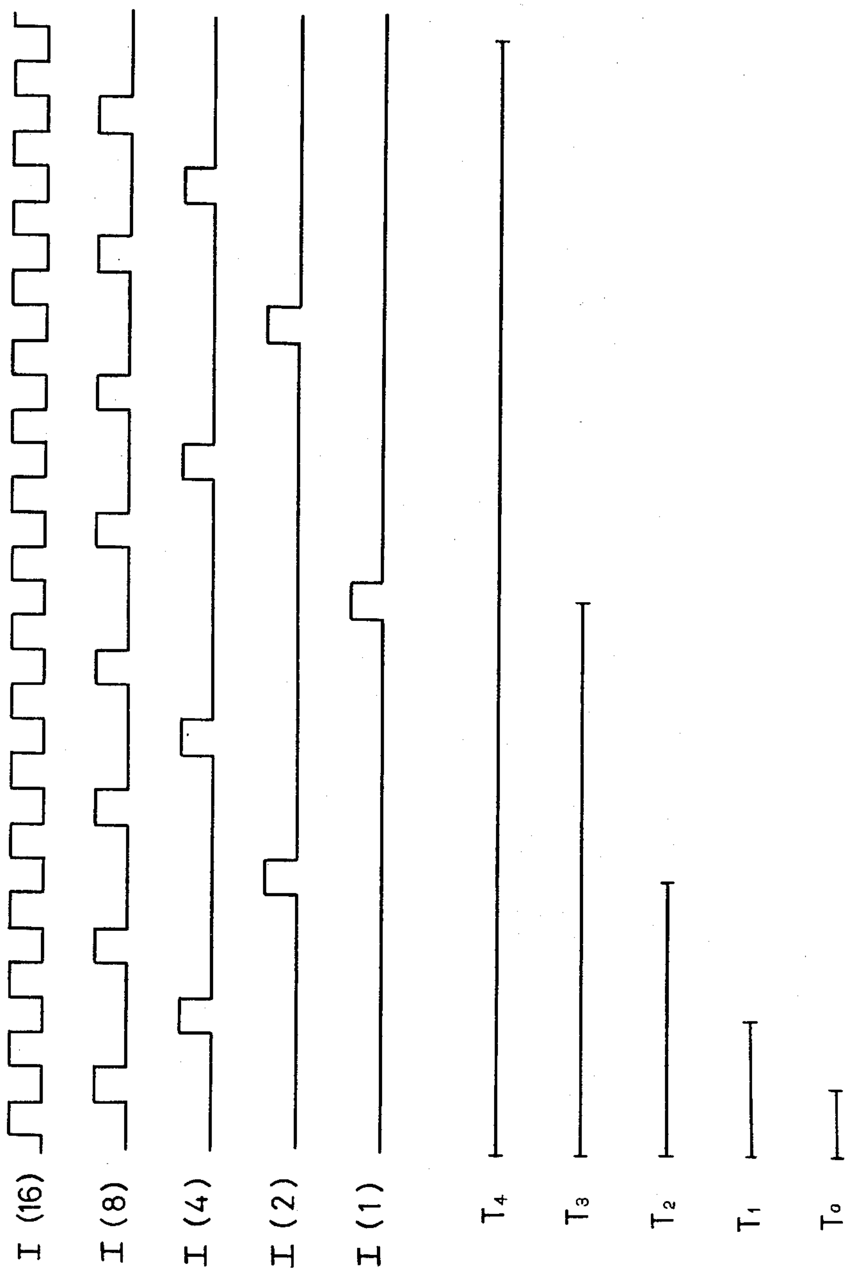
FIG. 7 is a waveform diagram illustrating the relation of pulse trains and pulse sending interval of the pulse distributor.

FIG. 7 shows a waveform diagram of the pulse train I and pulse sending time T and illustrates the relation between them. In FIG. 7, $T_4$ represents a pulse sending time for the case when the number of maximum transmitted pulses are 16 to 31. And similarly $T_3$, $T_2$, $T_1$ and $T_0$ represents pulse sending time when the number of maximum transmitted pulses are 8 to 15, 4 to 7, 3 to 2, and 1 respectively. It will be readily understood that the pulse sending time $T$ decreases when number of maximum transmitted pulses, in other words final pulse train sum $NdX$ which is to be distributed, decreases. Pulse sending time T and the time during which the flip-flop circuit 35 is set coincide.

Figure 8:
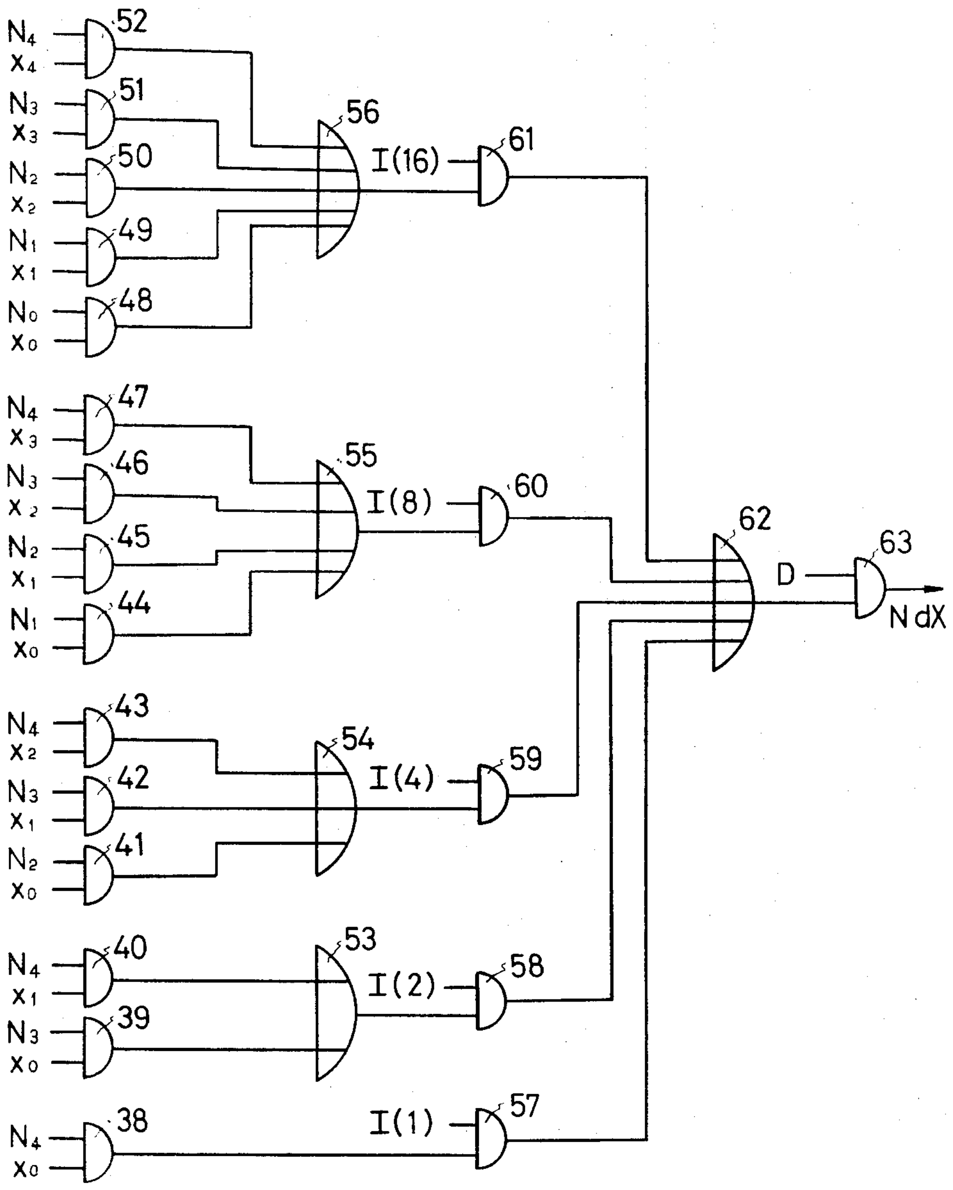
FIG. 8 is a block diagram illustrating the logical circuit of said pulse distributor acting as the means for obtaining the final pulse train sum.

FIG. 8 shows a block diagram of the logic circuit for the determination of the final pulse train sum $NdX$. The highest occupied bit position $N_0$ to $N_4$ and input information bits $x_0$ to $x_4$, for $dX$ are applied to AND gates or AND circuits 38 to 52 in the state shown in FIG. 8. The output of AND circuit 38 and pulse train I(1) are applied to AND circuit 57. Outputs of AND circuits 39 and 40 are applied to OR circuit 53, and the output of OR circuit 53 and pulse train I(2) are applied to AND circuit 58. The outputs of AND circuits 41, 42, and 43 are applied to OR circuit 54, and the output of said OR circuit 54 and pulse train I(4) are applied in turn to AND circuit 59. The outputs of AND circuits 44, 45, 46 and 47 are applied to OR circuit 55, and the output of said OR circuit 55 and pulse train I(8) are applied in turn to AND circuit 60. The outputs of AND circuits 48, 49, 50, 51 and 52 are applied to OR circuit 56, and the output of said OR circuit 56 and pulse train I(16) are applied in turn to AND circuit 61. Thus the gates 33–61 function as a means for selecting the pulse trains. Since outputs of AND circuits 57, 58, 59, 60 and 61 are applied to OR circuit 62 where they are summed, and the output of said OR circuit 62 is applied to AND circuit 63 together with the output D of flip-flop circuit 35 so as to control the interval of the summed pulse trains, so pulse train sum $NdX$ is obtained from AND circuit 63.

Though a detailed description of the processing of information $dX$ is given up to this point, information $dY$ could be processed quite similarly to obtain the pulse train sum $NdY$. And for three dimensional cases also, the pulse train sum could be obtained similarly by providing a $dZ$ register for storage of $dZ$ information, by determining the highest occupied bit position in the $dX$, $dY$, and $dZ$ registers, and by determining the pulse sending interval. And also this invention could be applied to the cases where number of inputs becomes four or more and four or more registers are utilized to store the input information.

Although the illustrative embodiment of this invention has been described in detail up to this point with references to the accompanying drawings, it is to be understood that this invention is not limited to the above embodiment, and that various changes and modifications may be effected therein without departing from the scope or spirit of the invention as defined in the appended claims.

What is claimed is:

1. A method for pulse distribution which comprises detecting the highest occupied bit position for plural multibit inputs, determining the pulse sending interval corresponding to the highest occupied bit position, selecting one or more pulse trains corresponding to the inputs as a function of the highest occupied bit position and the input bits, and obtaining a pulse train sum by sending out said selected pulse trains in the pulse sending interval.

2. A method for pulse distribution according to claim 1, wherein the number of said inputs is two.

3. A method for pulse distribution according to claim 1, wherein the number of said inputs is three.

4. A method for pulse distribution according to claim 1, wherein the highest occupied bit position is determined by logically summing the inputs in each bit position and logically multiplying each of the logical sums by NOT values of logical sums of all higher bit positions to obtain the highest occupied bit position.

5. A method for pulse distribution according to claim 1, wherein the pulse sending interval becomes twofold or half respectively when the highest occupied bit position increases one bit or decreases one bit.

6. An apparatus for pulse distribution comprising plural registers for storing respective plural multibit inputs, detecting means coupled to said plural registers for detecting the highest occupied bit position for all of the plural inputs, interval determining means coupled to said detecting means for determining a pulse sending interval corresponding to said highest occupied bit position, a pulse generator for generating plural pulse trains, selecting means coupled to said pulse generator said detecting means and said plural registers for selecting one or more of said pulse trains as a function of said highest occupied bit position and the bits of said inputs, and summing means coupled to said selecting means for obtaining the pulse train sum of said selected pulse trains and pulse train interval control means coupled to said summing means and said interval determining means for generating pulses of said pulse train sum during said pulse sending interval.

7. An apparatus for pulse distribution according to claim 6, wherein said means for determining said pulse sending interval comprises a timing counter and a flip-flop circuit which is coupled to and controlled by the output of said timing counter and said detecting means.

8. An apparatus for pulse distribution according to claim 6 wherein said selecting means includes first AND circuits coupled to said plural registers and said detecting means, first OR circuits to which the outputs of said first AND circuits are applied, second AND circuits to which outputs of said first OR circuits and one of said predetermined pulse trains are applied repsectively; said summing means comprising second OR circuits to which all of the outputs of said second AND circuits are applied; and said control means comprising a third AND circuit to which all of the outputs of said second OR circuits and output of said interval determining means are applied.

* * * * *